US008594553B2

(12) United States Patent
Uematsu et al.

(10) Patent No.: US 8,594,553 B2
(45) Date of Patent: Nov. 26, 2013

(54) CLEANING BLADE FOR ELECTROPHOTOGRAPHIC APPARATUS, AND METHOD FOR PRODUCING THE SAME

(75) Inventors: Erika Uematsu, Fukui (JP); Arihiro Yamamoto, Ushiku (JP); Syouji Inoue, Ushiku (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 104 days.

(21) Appl. No.: 13/312,638

(22) Filed: Dec. 6, 2011

(65) Prior Publication Data

US 2012/0163890 A1 Jun. 28, 2012

(30) Foreign Application Priority Data

Dec. 24, 2010 (JP) ................................ 2010-287891

(51) Int. Cl.
*G03G 21/00* (2006.01)
*B32B 27/40* (2006.01)

(52) U.S. Cl.
USPC ....................................... 399/350; 428/423.1

(58) Field of Classification Search
USPC ........... 399/350, 351, 345, 34, 343, 326, 123, 399/346; 15/256.5, 256.52, 256.53, 256.51, 15/1.51; 428/422.8; 264/279.1, 233
See application file for complete search history.

(56) References Cited

U.S. PATENT DOCUMENTS 6,703,472 B2 * 3/2004 Miura et al. .................... 528/57
8,160,486 B2 4/2012 Inoue et al.
2004/0170841 A1 9/2004 Tomiyama et al.
2009/0022530 A1 * 1/2009 Inoue et al. .................. 399/350
2009/0290921 A1 11/2009 Mochizuki et al.

FOREIGN PATENT DOCUMENTS

JP 2007-078987 A 3/2007
JP 2008-268494 A 11/2008
JP 2009-025451 A 2/2009

OTHER PUBLICATIONS

Office Action in Korean Application No. 10-2011-136248 (dated Dec. 11, 2012).

* cited by examiner

*Primary Examiner* — Clayton E LaBalle
*Assistant Examiner* — Victor Verbitsky
(74) *Attorney, Agent, or Firm* — Fitzpatrick, Cella, Harper & Scinto

(57) ABSTRACT

A cleaning blade for an electrophotographic apparatus including a thermosetting polyurethane elastomer blade member, in which in the blade member, a concentration of nitrogen is gradually increased from an inside of a contact region to contact the image bearing member toward the surface of the contact region; and a relationship between an amount of the concentration of nitrogen to be changed $\Delta1=N_0-N_5$ and an amount of the concentration of nitrogen to be changed $\Delta2=N_5-N_e$ is $\Delta1>\Delta2$ wherein a concentration of nitrogen in the surface $N_0$ is not less than 1.5 wt % and not more than 20.0 wt %, a concentration of nitrogen $N_e$ at a depth in which the concentration of nitrogen is no longer changed is not less than 0.7 wt % and not more than 10 wt %, and $N_5$ is a concentration of nitrogen at a depth of 5 μm.

6 Claims, 1 Drawing Sheet

CLEANING BLADE FOR ELECTROPHOTOGRAPHIC APPARATUS, AND METHOD FOR PRODUCING THE SAME

BACKGROUND OF THE INVENTION

1. Field of the Invention

The present invention relates to a cleaning blade for an electrophotographic apparatus used to remove a remaining toner on image bearing members such as a photoreceptor drum, a transfer belt, and an intermediate transfer member, which are used in an electrophotographic apparatus.

2. Description of the Related Art

In an electrophotographic apparatus, a variety of cleaning blades are disposed in order to remove a remaining toner on image bearing members such as a photoreceptor drum, a transfer belt, and an intermediate transfer member. Blade members of these cleaning blades are mainly formed with a thermosetting polyurethane elastomer from the viewpoint of plastic deformation and resistance to wear.

Recently, a demand for high quality images has been increased, leading to a more spherical form of a toner with a smaller particle size. For this reason, higher cleaning performance has been demanded of the cleaning blade, and better contact of the cleaning blade with the image bearing member has been examined in order to ensure such cleaning performance.

Unfortunately, a larger contact pressure increases the friction between the blade member and the image bearing member. For this reason, the drive torque of the image bearing member is increased, and the blade member may be turned over. Accordingly, in order to reduce the drive torque of the image bearing member, reduction in the friction with the blade member, namely, production of the blade member having smaller friction is considered.

As a method for solving the problems concerning the cleaning blade formed with a thermosetting polyurethane elastomer, techniques (1) to (3) below are known.

(1) The hardness of the entire thermosetting polyurethane elastomer is increased to reduce friction.

(2) A laminate structure with high hardness is provided in an edge portion of the blade member to contact the image bearing member (Japanese Patent Application Laid-Open No. 2008-268494).

(3) A polyurethane resin as a base material for the blade member is reacted with an isocyanate compound to provide a cured layer in the contact region of the blade member to contact the image bearing member (Japanese Patent Application Laid-Open No. 2007-078987).

Unfortunately, the methods above have problems described below.

In the method (1), if the hardness of the entire blade member is high, the image bearing member is easily worn out or damaged.

In the method (2), two materials having different properties are layered. For this reason, the behaviors of the two materials when the blade contacts the image bearing member are different, and no stable contact state can be obtained.

In the method (3), the blade member is produced as follows: a polyurethane resin as a base material for the blade member is impregnated with an isocyanate compound, and the remaining isocyanate compound on the surface is removed. However, if the friction of the contact region of the blade member to contact the image bearing member is reduced to a necessary level, namely, if the hardness of the contact region of the blade member is increased, a wider range within the contact region is unintendedly impregnated with the isocyanate compound to increase the hardness of the contact region. As a result, a region short of rubber elasticity is increased, and cleaning properties are reduced.

SUMMARY OF THE INVENTION

Accordingly, an object of the present invention is to provide a cleaning blade for an electrophotographic apparatus having an efficiently increased hardness in at least a contact region to contact an image bearing member, improved slip properties to the image bearing member, and good cleaning properties, without turn-over in the blade. Another object of the present invention is to provide a method for producing a cleaning blade for an electrophotographic apparatus having such properties.

The objects above are achieved by the invention having the following configuration.

1. A cleaning blade for an electrophotographic apparatus for contacting an image bearing member in an electrophotographic apparatus and removing a remaining toner, the cleaning blade including a supporting member and a thermosetting polyurethane elastomer blade member joined to the supporting member, wherein in the blade member, a concentration of nitrogen is gradually increased from an inside of a contact region to contact the image bearing member toward the surface of the contact region; the structure is formed by contacting an isocyanate compound with the contact region to impregnate the contact region with the isocyanate compound; and a relationship between an amount of the concentration of nitrogen to be changed $\Delta 1=N_0-N_5$ and an amount of the concentration of nitrogen to be changed $\Delta 2=N_5-N_e$ is $\Delta 1>\Delta 2$ wherein a concentration of nitrogen $N_0$ on the surface of the contact region is not less than 1.5 wt % and not more than 20.0 wt %, a concentration of nitrogen $N_e$ is not less than 0.7 wt % and not more than 10 wt % at a depth in which the concentration of nitrogen is no longer changed in the inside of the contact region in the thickness direction vertical to the surface of the contact region, and $N_5$ is a concentration of nitrogen at a depth of 5 μm toward the inside of the contact region in the vertical thickness direction.

2. The cleaning blade for an electrophotographic apparatus according to 1 above, wherein $0 \le H_a - H_b \le 2.0$ (IRHD) wherein $H_a$ is a hardness of the contact region of the blade member to contact the image bearing member, and $H_b$ is a hardness of a portion in which the concentration of nitrogen is not gradually increased from the inside toward the surface of the contact region.

3. A method for producing the cleaning blade for an electrophotographic apparatus according to 1 or 2 above, the method comprising: contacting an isocyanate compound with the surface of the contact region of the thermosetting polyurethane elastomer blade member to contact the image bearing member in an amount of the isocyanate compound such that a concentration of an isocyanate group is not less than $1.0\times10^{-5}$ mmol/mm$^2$ and not more than $50.0\times10^{-5}$ mmol/mm$^2$, thereby to impregnate the inside of the blade member with the isocyanate compound.

4. The method for producing a cleaning blade for an electrophotographic apparatus according to 3 above, wherein after the isocyanate compound is contacted with the blade member to impregnate the blade member therewith, the isocyanate compound that remains on the surface of the blade member is not removed and is left as it is.

In the cleaning blade for an electrophotographic apparatus according to the present invention, the contact region to contact an image bearing member includes a portion having a high hardness. Thereby, the slip properties to the image bearing member are improved. Accordingly, when the cleaning blade is assembled in an electrophotographic apparatus, the blade is not turned over, and good cleaning properties are provided.

Further features of the present invention will become apparent from the following description of exemplary embodiments with reference to the attached drawings.

DESCRIPTION OF THE EMBODIMENTS

Figure 1A:
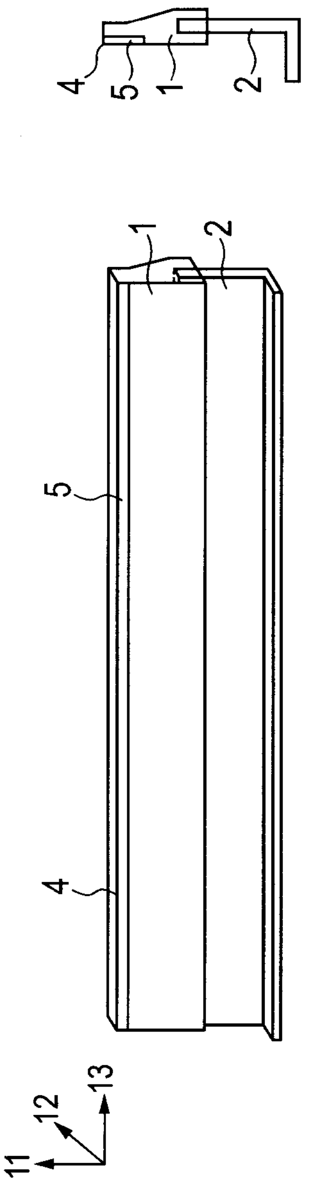
FIGS. 1A and 1B are perspective view illustrating a configuration of a cleaning blade for an electrophotographic apparatus according to the present invention.

Preferred embodiments of the present invention will now be described in detail in accordance with the accompanying drawings.

Hereinafter, an embodiment according to the present invention will be described.

The cleaning blade for an electrophotographic apparatus according to the present invention includes an elastic body formed with a thermosetting polyurethane elastomer (blade member) and a supporting member formed with a metal or a hard plastic, for example, that supports the elastic body. An edge of the thermosetting polyurethane elastomer blade member contacts an image bearing member to remove a remaining toner on the image bearing member.

In the present invention, a portion of the thermosetting polyurethane elastomer blade member to contact the image bearing member (contact region) has a concentration of nitrogen gradually increased from the inside toward the surface of the contact region. Namely, unlike a laminate structure of materials having different properties formed by coating or lamination, the contact region of the blade member to contact the image bearing member has a structure in which the concentration of a hard segment is gradually increased from the inside toward the surface of the contact region. Accordingly, the behavior of the edge of the contact region is stable when the contact region contacts the image bearing member. In order to increase the concentration of nitrogen on the surface of the contact region in such a manner, the surface of the polyurethane elastomer is impregnated with an isocyanate compound as described later. Hereinafter, the "contact region of the blade member to contact the image bearing member" is referred to as a "blade member contact region" or a "contact region" in some cases for convenience.

In the thermosetting polyurethane elastomer, the amount of the isocyanate compound to be used for impregnation is proportional to the hardness. As described above, in the method in which the blade member is impregnated with an isocyanate compound, and the isocyanate compound that remains on the surface of the blade member is removed, the hardness of the surface of the contact region is increased to a level in which necessary slip properties are obtained, a wider range of a portion deeper than the contact region is impregnated with the isocyanate compound. For this reason, a region short of the rubber elasticity needed for the blade member is increased, leading to reduction in cleaning properties. In the present invention, the amount of the isocyanate compound to be contacted with the contact region is properly determined, and the isocyanate compound that remains on the surface of the contact region after impregnation is not removed. Thereby, the hardness of a portion closest to the surface of the contact region can be efficiently increased, and the rubber elasticity can be ensured to the portion closer to the surface of the contact region.

Preferably, the concentration of nitrogen $N_0$ in the surface of the contact region is not less than 1.5 wt %, and more preferably not less than 2.0 wt %, and preferably not more than 20.0 wt %. At $N_0$ less than 1.5 wt %, sufficient slip properties to the image bearing member are not obtained, and turn-over is produced. At $N_0$ more than 20.0 wt %, the contact region to contact the image bearing member is excessively hard, resulting in damages to the surface of the image bearing member. The concentration of nitrogen $N_e$ in a position in which the concentration of nitrogen is no longer changed from the surface of the contact region toward the inside thereof in the thickness direction vertical to the surface of the contact region (base material) is preferably not less than 0.7 wt % and not more than 10 wt %. This is for the following reason: at $N_e$ of not less than 0.7 wt %, the amount of the hard segment needed for resistance to wear is sufficient, and at $N_e$ of not more than 10.0 wt %, this is not the case where the rubber elasticity needed for cleaning is insufficient due to an excessive amount of the hard segment. Preferably, $\Delta 1>\Delta 2$ wherein the concentration of nitrogen in a position 5 μm inner from the surface of the contact region is $N_5$, the difference between $N_5$ and the concentration of nitrogen $N_0$ in the surface of the contact region is $\Delta 1=N_0-N_5$, and the difference between $N_5$ and the concentration of nitrogen $N_e$ in the position in which the concentration of nitrogen is no longer changed is $\Delta 2=N_5-N_e$. This shows that the concentration of nitrogen (concentration of the hard segment) in a portion extremely close to the surface of the contact region is high, namely, the friction of the surface of the contact region and that of the portion in the vicinity thereof are reduced, while the rubber elasticity of the inside of the contact region is kept high. Accordingly, if $\Delta 1<\Delta 2$, a region having a high concentration of the hard segment is formed to a portion 5 μm deeper than the surface of the contact region. Undesirably, the region short of the rubber elasticity is formed at such a depth, therefore reducing the cleaning performance.

As a preferable amount of the isocyanate compound to be applied to the blade member contact region, the concentration of an isocyanate group per unit area Y is not less than $1.0\times 10^{-5}$ mmol/mm$^2$ and not more than $50.0\times 10^{5}$ mmol/mm$^2$. The concentration of an isocyanate group per unit area Y is determined by the following expression (1):

$$Y=(W_{iso}/M_{niso}\times 1000\times F_n)/S \qquad \text{Expression (1)}$$

(wherein Y is the concentration of an isocyanate group per unit area, $W_{iso}$ is the amount of the isocyanate compound to be applied (g), $M_{niso}$ is the molecular weight of the isocyanate compound, $F_n$ is the number of isocyanate groups per molecule in the isocyanate compound, and S is the area (mm$^2$) in which the isocyanate compound is applied.)

If Y is less than $1.0\times 10^{5}$ mmol/mm$^2$, the amount of the isocyanate compound in order to increase the hardness is insufficient, resulting in insufficient slip properties of the blade member contact region. If Y is more than $50.0\times 10^{-5}$ mmol/mm$^2$, an excessive amount of the isocyanate compound remains on the surface of the blade member without impregnation of the inside of the blade member. For this reason, the hardness of the contact region becomes excessively high, and the image bearing member is damaged.

In the blade member according to the present invention, preferably, $0\leq H_a-H_b\leq 2.0$ (IRHD), wherein $H_a$ is the hardness of the portion having the structure in which the concentration of nitrogen is gradually increased from the inside toward the surface of the contact region (portion treated with the isocyanate compound), and $H_b$ is the hardness of the portion having no such a structure (portion not treated with the isocyanate compound). Namely, preferably, only the friction of the portion in the vicinity of the surface of the blade member contact region can be reduced while the rubber elasticity of the base material can be sufficiently kept. Accordingly, preferably, only the hardness of the portion in the vicinity of the surface of the contact region is increased, while the IRHD hardness as the blade member has no change before and after the treatment or the amount of the IRHD hardness to be changed is small. This is because if the difference is more than 2.0 (IRHD), the contact region of the blade member to contact the image bearing member has the region having a high concentration of the hard segment not only near the surface of the contact region but also in a portion deeper from the surface; for this, the rubber elasticity of the contact region is insufficient, and the cleaning properties are reduced. If the difference is less than 0 (IRHD), namely, the hardness is reduced after the treatment with the isocyanate compound is performed, the friction of the blade member contact region is not reduced, resulting in insufficient slip properties.

Preferably, the depth of the isocyanate compound to be used for impregnation is a depth such that the rubber elasticity of the blade member is not lost. As described above, preferably, a region such that the difference between the hardness of the portion of the blade member impregnated with an isocyanate compound and that of the portion not impregnated with the isocyanate compound is not more than 2.0 (IRHD).

In the present invention, the isocyanate compound is contacted with the contact region of the blade member to contact the image bearing member. Thereby, the structure in which the concentration of nitrogen is gradually increased from the inside of the contact region toward the surface of the contact region is formed. As the isocyanate compound to be contacted, those having at least one or more isocyanate groups in the molecule can be used.

As the isocyanate compound having one isocyanate group in the molecule, aliphatic monoisocyanates such as octadecyl isocyanate (ODI), and aromatic monoisocyanates such as phenyl isocyanate (PHI) can be used.

As the isocyanate compound having two isocyanate groups in the molecule, usually, those used for production of a polyurethane resin can be used. Specifically, examples of those can include: 2,4-tolylene diisocyanate (2,4-TDI), 2,6-tolylene diisocyanate (2,6-TDI), 4,4'-diphenylmethane diisocyanate (MDI), m-phenylene diisocyanate (MPDI), tetramethylene diisocyanate (TMDI), hexamethylene diisocyanate (HDI), and isophorone diisocyanate (IPDI).

As the isocyanate compound having three or more isocyanate groups, 4,4',4"-triphenylmethane triisocyanate, 2,4,4'-biphenyl triisocyanate, and 2,4,4'-diphenylmethane triisocyanate can be used, for example. As the isocyanate compound having two or more isocyanate groups, modified derivatives thereof and multimers thereof can also be used.

Among them, in order to efficiently increase the hardness, preferable is MDI having high crystallinity, namely, having a symmetric structure. More preferable is MDI including a modified body for workability because the MDI is a liquid at normal temperature.

The method for contacting an isocyanate compound with a non-treated blade member is not particularly limited, and examples of the method include dropping, spray coating, and sponge coating.

In the present invention, after contacting of and impregnation with the applied isocyanate compound, the isocyanate compound that remains on the surface of the contact region of the blade member is not wiped for removal. For this reason, a non-contacting application method is preferable so as not to impair the smoothness of the surface of the portion impregnated with the isocyanate compound. In order to obtain surface properties after application, the applied isocyanate compound may be leveled by air blow, for example.

The isocyanate compound may be used as it is, or may be diluted by a solvent and used. The solvent used for dilution is not particularly limited as long as the isocyanate compound in use is dissolved in the solvent. For example, toluene, xylene, butyl acetate, methyl isobutyl ketone, and methyl ethyl ketone can be used.

Preferably, the viscosity of the isocyanate compound coating solution is not more than 100 mPa·s in order to uniformly apply a small amount of the isocyanate compound coating solution so as not to impair the surface properties of the portion to which the isocyanate compound (including the solution prepared by diluting the isocyanate compound by the solvent) is applied. At a viscosity more than 100 mPa·s, the viscosity is excessively high, the leveling properties of the solution applied on the surface of the blade member are poor. For this reason, undesirably, the surface of the applied portion has depressions and projections, or the amount of the isocyanate compound to be treated is uneven. Namely, an excessively high viscosity is likely to cause faulty cleaning because projections and depressions of the surface or uneven hardness prevents the blade member from uniformly contacting the image bearing member.

Preferably, the contact angle of the isocyanate compound (including the solution prepared by diluting the isocyanate compound by the solvent) to the non-treated blade member is not less than 2° and not more than 50°. At a contact angle less than 2°, the isocyanate compound is widely spread, and a necessary amount of the isocyanate compound cannot be applied. At a contact angle more than 50°, the isocyanate compound is not sufficiently spread, and uniform application of a necessary amount of the isocyanate compound is difficult, reducing the surface properties.

Figure 1B:
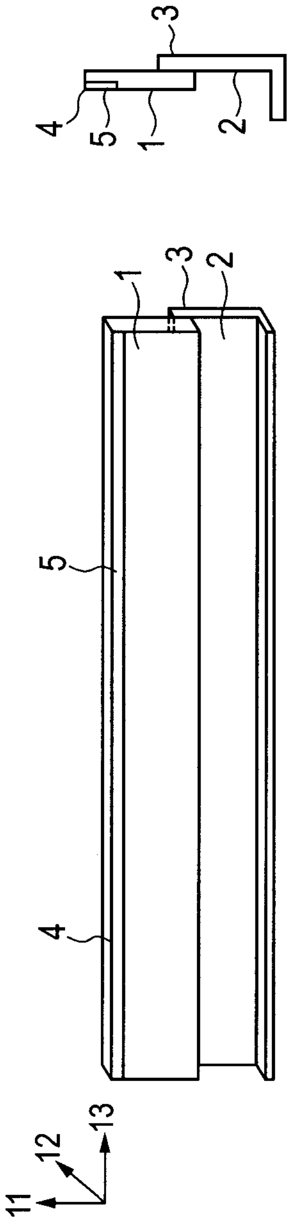
Figure 2A:
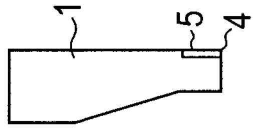
FIGS. 2A, 2B and 2C are sectional view of a blade member for a cleaning blade for an electrophotographic apparatus.
Figure 2B:
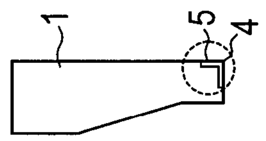
Figure 2C:

FIGS. 1A, 1B and FIGS. 2A to 2C illustrate examples of a cleaning blade for an electrophotographic apparatus according to the present invention. FIGS. 1A and 1B are schematic view illustrating the configuration of the cleaning blade. FIGS. 2A to 2C are sectional view illustrating examples of patterns of impregnation of the blade member with the isocyanate compound.

The region in which the blade member is impregnated with the isocyanate compound may be a region including at least an edge portion 4 in which the cleaning blade for an electrophotographic apparatus contacts the image bearing member.

As the surface properties of the blade member after impregnated with the isocyanate compound, the ten-point height of irregularities $Rz_{jis}$ (JIS B0601; 2001) is preferably not more than 5.0 μm. This is because if the $Rz_{jis}$ is more than 5.0 μm, the blade member does not uniformly contact with the image bearing member, and the toner is likely to slip through the blade member.

In the surface of the contact region of the blade member to contact the image bearing member and impregnated with an isocyanate compound, the friction coefficient is preferably not more than 2.0. This is because if the friction coefficient is more than 2.0, the slip properties to the image bearing member are insufficient, and the tip of the blade is easily turned over.

In the present invention, the thermosetting polyurethane elastomer that forms the blade member mainly includes a polyisocyanate, a high molecular weight polyol, a chain extender that is a low molecular weight polyol such as bifunctional polyols and trifunctional polyols, and a catalyst. Hereinafter, these components will be described in detail.

As the polyisocyanate, those shown below can be used, for example: 4,4'-diphenylmethane diisocyanate (MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide modified MDI, and polymethylenephenyl polyisocyanate (PAPI). Among these, preferable is use of MDI for its high mechanical properties.

Examples of the high molecular weight polyol can include polyester polyols, polyether polyols, caprolactone ester polyols, polycarbonate ester polyols, and silicone polyols. These may be used singly or in combinations of two or more. A plurality of these may be mixed and used. The number average molecular weight of these polyols is preferably 1500 to 4000. The range is preferable for the following reasons: at a number average molecular weight of not less than 1500, the obtained urethane elastomer has high hardness and physical properties; at a number average molecular weight of not more than 4000, a prepolymer has a proper viscosity from the viewpoint of moldability.

As the chain extender, those that can extend the polyurethane elastomer chain, e.g., glycols are used. Examples of such glycols can include: ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol. Other than the glycols above, other polyhydric alcohols can be used. Examples of the other polyhydric alcohols can include trimethylolpropane, glycerol, pentaerythritol, and sorbitol. These can be used singly or in combinations of two or more.

As the catalyst, catalysts usually used to cure the polyurethane elastomers can be used, and examples of the catalyst can include tertiary amine catalysts. Specifically, examples of the catalyst can include: aminoalcohols such as dimethylethanolamine and N,N,N'-trimethylaminopropylethanolamine; trialkylamines such as triethylamine; tetraalkyldiamines such as N,N,N'N'-tetramethyl-1,3-butanediamine; triethylenediamine, piperazine compounds, and triazine compounds. Organic acid salts of metals such as potassium acetate and potassium octylate alkali can also be used. Further, metal catalysts usually used for formation of urethane, for example, dibutyltin dilaurate can also be used. These may be used singly or in combinations of two or more.

When necessary, additionally, additives such as pigments, a plasticizer, a waterproofing agent, an antioxidant, an ultraviolet absorbing agent, and a light stabilizer can be blended.

The shapes of the supporting member and blade member are not particularly limited. The supporting member and the blade member each may have a shape suitable for the purpose of use.

For example, the supporting member is disposed within a metal mold for the cleaning blade, the thermosetting polyurethane elastomer raw material composition is poured into the metal mold, and reacted by heating to be cured. Thereby, the cleaning blade according to the present invention shown in FIG. 1A, in which a blade member 1 and a supporting member 2 are integrated, can be obtained. At this time, preferably, an adhesive is applied in advance in a joint portion of the supporting member 2 to the blade member 1.

Alternatively, a sheet of the thermosetting polyurethane elastomer is separately molded, and cut into strips. The strip is used as the blade member 1, and bonded to the supporting member 2 by an adhesive. Thus, a cleaning blade shown in FIG. 1B can be obtained, for example. In FIG. 1B, an adhesive layer 3 is provided.

The material that forms the supporting member is not particularly limited. The supporting member can be formed with metals and resins, and more specifically, a metal material such as steel sheets, stainless steel sheets, zinc-plated chromate-coated steel sheets, and chromium-free steel sheets, and a resin material such as 6-nylon and 6,6-nylon.

The method for joining the supporting member 2 to the blade member 1 is not particularly limited, and a suitable method may be selected from known methods. Examples of the method can include a method of bonding the supporting member 2 to the blade member 1 using an adhesive of a phenol resin.

The state of the blade member at the time of application of the isocyanate compound may be a single blade member, or the blade member bonded to the supporting member. Moreover, before cutting is performed in order to provide an edge of the cleaning blade to contact the image bearing member, a portion corresponding to the contact region of the blade member can be impregnated with the isocyanate compound to react the isocyanate compound, and then the edge portion can be cut. The cutting also may be performed on the blade member before joining or on the obtained blade.

EXAMPLES

Hereinafter, using Examples, the present invention will be described. These Examples, however, will not limit the present invention.

First, in Examples and Comparative Examples below, the followings were used as raw materials. Other than those shown below, reagents or industrial chemicals were used.

—Supporting Member for Cleaning Blade

An iron sheet having a thickness of 1 mm was punched out, and folded into a shape shown by reference numeral 2 of FIG. 1A. As a supporting member for a cleaning blade, the holder thus produced was used. The holder has an adhesive for adhesion to a polyurethane resin (Chemlok 219 (trade name), made by LORD Corporation) applied to a portion of the holder to which the blade member is applied.

—Raw Material for Blade Member

MDI: 4,4'-diphenylmethane diisocyanate (trade name; Millonate MT, made by Nippon Polyurethane Industry Co., Ltd.)

PBA: polybutylene adipate polyester polyol having a number average molecular weight of 2500

PHA: polyhexylene adipate polyester polyol having a number average molecular weight of 1000

14BD: 1,4-butanediol

TMP: trimethylolpropane

Catalyst A: DABCO P15 (trade name, made by Air Products Japan, Inc., EG solution of potassium acetate)

Catalyst B: N,N-dimethylaminohexanol (trade name; KAOLIZER No. 25, made by Kao Corporation)

—Isocyanate Compound for Impregnating Blade Member

MDI: the same as above

Modified MDI: carbodiimide modified MDI (trade name; Millionate MTL, made by Nippon Polyurethane Industry Co., Ltd.)

Polymeric MDI: polymeric MDI (trade name; MR400, made by Nippon Polyurethane Industry Co., Ltd.)

Prepolymer: prepolymer having an NCO content of 15.0 wt % (trade name: CORONATE 2041, made by Nippon Polyurethane Industry Co., Ltd.)

Production Example 1

Production of Cleaning Blade for Impregnation 326.3 g of MDI was reacted with 673.7 g of PBA at 80° C. for 3 hours to obtain a prepolymer having an NCO % of 8.50%. To the prepolymer, 198.4 g of a curing agent prepared by adding 26.2 g of 14BD, 21.4 g of TMP, 0.07 g of the catalyst A and 0.28 g of the catalyst B to 150.8 g of PHA was blended to prepare a polyurethane elastomer raw material composition for a blade member. The obtained mixture was poured into a metal mold for molding a cleaning blade in which the supporting member was disposed with the adhesive applied portion being protruded within the cavity, and cured at 130° C. for 2 minutes. Then, the obtained product was removed from the metal mold to obtain a cleaning blade before impregnation with the isocyanate compound. The blade member had a blade free length direction 11 of 240 mm, a blade thickness direction 12 of 15 mm (in the edge of the image bearing member contact region) and a blade longitudinal direction 13 of 2.0 mm.

Example 1

To the surface of the contact region of the blade member of the cleaning blade to contact the image bearing member before impregnation with the isocyanate compound produced above, application of and impregnation with the modified MDI as the isocyanate compound were performed at a width of 5 mm from the contact edge under an environment of 25° C., and left and aged under an environment of 23° C./55 RH % for 3 hours. Subsequently, in order to provide edge properties in the contact region of the blade member to contact the image bearing member, the obtained blade member was cut by 2 mm, and a cleaning blade for an electrophotographic apparatus treated with the isocyanate compound was produced as illustrated in FIG. 1A. The number of moles of isocyanate was calculated from the amount of the isocyanate compound to be applied, and the concentration of an isocyanate group per unit area was calculated. The number of moles was $41.7\times10^{-5}$ mmol/mm$^2$.

The obtained cleaning blade was evaluated by the following method. The obtained result is shown in Table 1.

<Measurement of Concentration of Nitrogen>

For measurement of the concentration of nitrogen, an electron beam microanalizer EPMA-1610 (trade name) made by Shimadzu Corporation was used. A sample to be measured was used, in which the blade was aged in an environment of 23° C./55 RH % for 24 hours, the portion of the blade member impregnated with an isocyanate compound was cut in a thickness direction vertical to the surface, and the cross section was carbon deposited. As the measurement condition, the accelerating voltage was 15 kV, the irradiation current was 100 nA, and the measurement pitch was 0.1 μm.

The concentrations of nitrogen from the surface to the inside were measured. As a result, the concentrations of nitrogen were as shown below.

Concentration of nitrogen $N_0$ on the surface of the contact region: 10.5 wt %.

Concentration of nitrogen $N_5$ in a position at a depth of 5 μm toward the inside in the vertical thickness direction: 4.1 wt %.

Concentration of nitrogen $N_e$ at a depth in which the concentration of nitrogen is no longer changed in the inside in the thickness direction vertical to the surface of the contact region: 1.3 wt %.

Amounts of the concentration of nitrogen to be changed $\Delta1=N_0-N_5=6.4$ wt %, $\Delta2=N_5-N_e=2.8$ wt %.

<Viscosity of Solution>

The viscosity of the isocyanate compound was measured in an environment of 25° C. using a viscometer "SV-type viscometer SV-10" (trade name) made by A&D Company, Limited. As a result, the viscosity of the isocyanate compound used in the present Example was 76 mPa·s.

<Contact Angle>

As the contact angle of the isocyanate compound to the non-treated blade member, using a contact angle meter CA-X (trade name) made by Kyowa Interface Science Co., Ltd., a value when droplets of 1.0 μL of the isocyanate compound were contacted with the blade member under an environment of 25° C. was measured. As a result, the contact angle of the isocyanate compound used in the present Example to the blade member was 44°.

<Hardness of Blade Member (International Rubber Hardness Degree (IRHD))>

The hardness before and after the blade member was impregnated with the isocyanate compound was determined as follows: on the same condition as that in production of the blade member described above, a polyurethane elastomer sheet having a thickness of 2 mm was produced, and a portion not impregnated with the isocyanate compound and a portion impregnated with the isocyanate compound each were measured. In the measurement of the hardness, using a hardness tester made by H. W. WALLACE and Co. Ltd., the international rubber hardness degree (IRHD) was measured according to JIS K6253. Upon the measurement, a sheet to be measured was aged in advance under an environment of 23° C./55% RH for 48 h. As a result of the measurement, the hardness of the blade member in the present Example was 72.3 IRHD before impregnation and 73.4 IRHD after impregnation. Namely, $H_a$ was 73.4 IRHD, $H_b$ was 72.3 IRHD, and the difference ($H_a-H_b$) was 1.1 IRHD.

<Check for Surface Properties>

The surface properties were checked by the ten-point height of irregularities $Rz_{jis}$ (JIS B0601; 2001). For the measurement of the ten-point height of irregularities, a surface roughness measuring instrument SURFCORDER SE3500 (trade name) made by Kosaka Laboratory Ltd. was used. As the measurement condition, the length to be measured was 2.5 mm, the measurement speed was 0.1 mm/sec, and the cutoff was 0.8 mm. As a result, the surface properties of the contact region of the blade member to contact the image bearing member in the present Example was $Rz_{jis}$ of 0.6 μm.

<Friction Coefficient>

The friction coefficient of the surface of the contact region of the blade member to contact the image bearing member was measured using a HEIDON surface properties tester (trade name) made by Shinto Scientific Co., Ltd. The measurement was performed as follows: on the same condition as that in production of the cleaning blade shown in Example, a polyurethane elastomer sheet having a thickness of 2 mm was produced, and aged in an environment of 23° C.×55% for 48 hours. As the measurement condition, a stainless steel ball indenter with a load of 0.1 kg applied was contacted with the sheet, and the ball indenter was moved at 50 mm/min. The friction coefficient of the surface of the contact region of the blade member in the present Example was 0.5.

<Check for Turn-Over (Cleaning Properties)>

The produced cleaning blade was integrated into a laser beam printer (trade name: Canon LBP7700) made by Canon Inc., and a durability test of 10,000 sheets was performed under an environment of normal temperature. After the test was completed, the blade and the output sheets of the durability test were visually observed, and turn-over was evaluated by the criterion below:

A: no turn-over in the blade nor faulty cleaning is found,

B: faulty cleaning are slightly produced but not a problematic level, and

C: the blade is turned over or faulty cleaning are produced.

The cleaning blade according to the present Example had no turn-over in the blade and no faulty cleaning, and was rated as "A."

Example 2

The isocyanate compound was diluted by a solvent MIBK such that the concentration of the isocyanate compound was 50 wt %, and after that, a cleaning blade was produced in the same manner as in Example 1. The concentration of an isocyanate group per unit area at this time was $5.6\times10^{-5}$ mmol/mm$^2$. The viscosity of the isocyanate compound solution was 4 mPa·s, and the contact angle to the non-treated blade member was 27°.

The concentrations of nitrogen in the blade member were as follows:

$N_0$: 7.2 wt %, $N_5$: 3.3 wt %, $N_e$: 1.3 wt %; and $\Delta1=N_0-N_5=3.9$ wt %, $\Delta2=N_5-N_e=2.0$ wt %.

As the hardness of the blade member, the hardness in the portion treated with the isocyanate compound $H_a$ was 72.5 IRHD, that in the portion not treated with the isocyanate compound $H_b$ was 72.0 IRHD, and the difference was 0.5 IRHD. The portion treated with the isocyanate compound had a roughness $Rz_{jis}$ of 0.8 μm and a friction coefficient of 0.5. Further, as a result of evaluation using the printer above, no turn-over nor faulty cleaning was produced, and the cleaning blade in Example 2 was rated as "A."

Example 3

The isocyanate compound was diluted by the solvent MIBK such that the concentration of the isocyanate compound was 33 wt %, and after that, a cleaning blade was produced in the same manner as in Example 1. The concentration of an isocyanate group per unit area at this time was $1.9\times10^{-5}$ mmol/mm$^2$. The viscosity of the isocyanate compound solution was 1.7 mPa·s, and the contact angle to the non-treated blade member was 23°.

The concentrations of nitrogen in the blade member were as follows:

$N_0$: 4.5 wt %, $N_5$: 2.0 wt %, $N_e$: 1.3 wt %; and $\Delta1=N_0-N_5=2.5$ wt %, $\Delta2=N_5-N_e=0.7$ wt %.

As the hardness of the blade member, both of the hardness in the portion treated with the isocyanate compound $H_a$ and that in the portion not treated with the isocyanate compound $H_b$ were 72.0 IRHD (no difference). The portion treated with the isocyanate compound had a roughness $Rz_{jis}$ of 0.8 μm and a friction coefficient of 0.6. Further, as a result of evaluation using the printer above, no turn-over nor faulty cleaning was produced, and the cleaning blade in Example 3 was rated as "A."

Example 4

As the isocyanate compound to be contacted, a solution prepared by diluting the MDI by a solvent MEK such that the concentration was 33 wt % was used. After that, a cleaning blade was produced in the same manner as in Example 1. The concentration of an isocyanate group per unit area at this time was $2.1\times10^{-5}$ mmol/mm$^2$. The viscosity of the isocyanate compound solution was 1.2 mPa·s, and the contact angle to the non-treated blade member was 6°.

The concentrations of nitrogen in the blade member were as follows:

$N_0$: 5.5 wt %, $N_5$: 3.1 wt %, $N_e$: 1.3 wt %; and $\Delta1=N_0-N_5=2.4$ wt %, $\Delta2=N_5-N_e=1.8$ wt %.

As the hardness of the blade member, the hardness in the portion treated with the isocyanate compound was 72.5 IRHD, that in the portion not treated with the isocyanate compound was 72.2 IRHD, and the difference was 0.3 IRHD. The portion treated with the isocyanate compound had a roughness $Rz_{jis}$ of 0.8 μm and a friction coefficient of 0.6. Moreover, as a result of evaluation using the printer above, no turn-over nor faulty cleaning was produced, and the cleaning blade in Example 4 was rated as "A."

Example 5

As the isocyanate compound to be contacted, a solution prepared by diluting the MDI by the solvent MEK such that the concentration was 50 wt % was used. After that, a cleaning blade was produced in the same manner as in Example 1. The concentration of an isocyanate group per unit area at this time was $22.1\times10^{-5}$ mmol/mm$^2$. The viscosity of the isocyanate compound solution was 3.8 mPa·s, and the contact angle to the non-treated blade member was 19°.

The concentrations of nitrogen in the blade member were as follows:

$N_0$: 12.8 wt %, $N_5$: 5.8 wt %, $N_e$: 1.3 wt %; and $\Delta1=N_0-N_5=7.0$ wt %, $\Delta2=N_5-N_e=4.5$ wt %.

As the hardness of the blade member, the hardness in the portion treated with the isocyanate compound was 75.5 IRHD, that in the portion not treated with the isocyanate compound was 72.2 IRHD, and the difference was 3.3 IRHD. The portion treated with the isocyanate compound had a roughness $Rz_{jis}$ of 1.1 μm and a friction coefficient of 0.5. Moreover, as a result of evaluation using the printer above, no turn-over was produced (A) while faulty cleaning were slightly produced but not a problematic level. Accordingly, the cleaning blade in Example 5 was rated as "B."

Example 6

A cleaning blade was produced in the same manner as in Example 5 except that the isocyanate compound was a polymeric MDI. The concentration of an isocyanate group per unit area at this time was $59.2\times10^{-5}$ mmol/mm$^2$. The viscosity of the isocyanate compound solution was 98 mPa·s, and the contact angle to the non-treated blade member was 48°.

The concentrations of nitrogen in the blade member were as follows:

$N_0$: 18.6 wt %, $N_5$: 5.5 wt %, $N_e$: 1.3 wt %; and $\Delta1=N_0-N_5=13.1$ wt %, $\Delta2=N_5-N_e=4.2$ wt %.

As the hardness of the blade member, the hardness in the portion treated with the isocyanate compound $H_a$ was 74.1 IRHD, that in the portion not treated with the isocyanate compound $H_b$ was 71.9 IRHD, and the difference was 2.2 IRHD. The portion treated with the isocyanate compound had a roughness $Rz_{jis}$ of 1.2 μm and a friction coefficient of 0.5. Moreover, as a result of evaluation using the printer above, no turn-over was produced (A) while faulty cleaning were slightly produced but not a problematic level. Accordingly, the cleaning blade in Example 6 was rated as "B."

In Examples 1 to 5, the blade member has a concentration of nitrogen $N_0$ of not less than 1.5 wt % on the surface of the contact region to contact the image bearing member, and the difference Δ1 of the concentration of nitrogen is greater than Δ2. For this reason, the hardness of the portion in the vicinity of the surface of the contact region is efficiently increased and the friction is sufficiently reduced, while the rubber elasticity in the inside of the contact region can be kept. Accordingly, no turn-over nor faulty cleaning is produced.

Comparative Example 1

The isocyanate compound was diluted by the solvent MIBK such that the concentration of the isocyanate compound was 10 wt %, and after that, a cleaning blade was produced in the same manner as in Example 1. The concentration of an isocyanate group per unit area at this time was $0.9\times10^{-5}$ mmol/mm$^2$. The viscosity of the isocyanate compound solution was 1.2 mPa·s, and the contact angle to the non-treated blade member was 11°.

The concentrations of nitrogen in the blade member were as follows:

$N_0$: 1.4 wt %, $N_5$: 1.3 wt %, $N_e$: 1.3 wt %; and $\Delta1=N_0-N_5=0.1$ wt %, $\Delta2=N_5-N_e=0$ wt %.

As the hardness of the blade member, both of the hardness in the portion treated with the isocyanate compound $H_a$ and that in the portion not treated with the isocyanate compound $H_b$ were 72.3 IRHD (no difference). The portion treated with the isocyanate compound had a roughness $Rz_{jis}$ of 0.8 μm and a friction coefficient of 2.1. As a result of evaluation using the printer above, turn-over was produced in the blade during the durability test, and evaluation was discontinued. For this reason, the cleaning blade was rated as "C" about the turn-over, and not evaluated about the faulty cleaning. This is because due to the excessively low concentration of nitrogen in the surface, sufficient slip properties could not be obtained, leading to the turn-over.

Comparative Example 2

A cleaning blade was produced in the same manner as in Example 1 except that the isocyanate compound to be contacted was replaced by the polymeric MDI. The concentration of an isocyanate group per unit area at this time was $65.1\times10^{-5}$ mmol/mm$^2$. The viscosity of the isocyanate compound solution was 155 mPa·s, and the contact angle to the non-treated blade member was 52°.

The concentrations of nitrogen in the blade member were as follows:

$N_0$: 19.1 wt %, $N_5$: 13.1 wt %, $N_e$: 1.3 wt %; and $\Delta1=N_0-N_5=6.0$ wt %, $\Delta2=N_5-N_e=11.8$ wt %.

As the hardness of the blade member, the hardness in the portion treated with the isocyanate compound $H_a$ was 74.1 IRHD, and that in the portion not treated with the isocyanate compound $H_b$ was 72.2 IRHD. The portion treated with the isocyanate compound had a roughness $Rz_{jis}$ of 5.2 μm and a friction coefficient of 0.8. As a result of evaluation using the printer above, the cleaning blade had no turn-over and was rated as "A." On the other hand, faulty cleaning were produced in the initial stage of the test, and the cleaning blade was rated as "C" about the faulty cleaning. This is because while the slip properties of the surface of the contact region can be ensured, an excessively high viscosity of the isocyanate compound solution caused increase in the thickness of the isocyanate compound solution to be applied, therefore making Δ2 greater than Δ1 in the concentration of nitrogen. For this reason, the rubber elasticity in the depth direction was lost. Additionally, due to an excessively high viscosity of the isocyanate compound solution contacted, the surface properties after application was poor, causing uneven contact with the photoreceptor drum. For this reason, the toner was slipped through the blade member to cause faulty cleaning.

Comparative Example 3

The amount of the isocyanate compound in Example 1 to be applied was increased such that the concentration of an isocyanate group per unit area was $57.2\times10^{-5}$ mmol/mm$^2$, and a cleaning blade was produced.

The concentrations of nitrogen in the blade member at this time were as follows:

$N_0$: 22.0 wt %, $N_5$: 18.2 wt %, $N_e$: 1.3 wt %; and $\Delta1=N_0-N_5=3.8$ wt %, $\Delta2=N_5-N_e=16.9$ wt %.

As the hardness of the blade member, the hardness in the portion treated with the isocyanate compound $H_a$ was 75.5 IRHD, and that in the portion not treated with the isocyanate compound $H_b$ was 72.2 IRHD. The difference $H_a-H_b$ was 3.3 IRHD. The portion treated with the isocyanate compound had a good friction coefficient of 0.9, but a large roughness $Rz_{jis}$ of 2.6 μm. As a result of evaluation using the printer above, the cleaning blade had no turn-over and was rated as "A." The cleaning blade was rated as "C" about the faulty cleaning because the slipped toner caused faulty image. This is because due to an excessively high concentration of an isocyanate group per unit area, the region having high concentration of nitrogen was spread deep inside of the contact region to reduce the rubber elasticity as the blade member, leading to reduction in the cleaning properties.

Comparative Example 4

A cleaning blade was produced in the same manner as in Example 1 except that after impregnation with the isocyanate compound, the impregnated surface was wiped by a sponge soaked with butyl acetate, and aged. The concentration of an isocyanate group applied per unit area was $41.7\times10^{-5}$ mmol/mm$^2$.

The concentrations of nitrogen in the blade member were as follows:

$N_0$: 5.0 wt %, $N_5$: 4.5 wt %, $N_e$: 1.3 wt %; and $\Delta1=N_0-N_5=0.5$ wt %, $\Delta2=N_5-N_e=3.2$ wt %.

As the hardness of the blade member, the hardness in the portion treated with the isocyanate compound $H_a$ was 75.2 IRHD, and that in the portion not treated with the isocyanate compound $H_b$ was 72.1 IRHD. The portion treated with the isocyanate compound had a good roughness $Rz_{jis}$ of 0.8 μm and a good friction coefficient of 0.8. For this reason, in evaluation using the printer above, the cleaning blade had no turn-over and was rated as "A." The cleaning blade was rated as "C" about the faulty cleaning because the slipped toner caused faulty image. This is for the following reason: because the isocyanate compound was wiped after impregnation, the amount of the isocyanate compound to be treated was increased in a portion deeper than the surface even at a sufficient level of the slip properties of the surface, and the rubber elasticity of the deeper portion was reduced compared to that in the surface, leading to reduction in the cleaning properties.

Comparative Example 5

A cleaning blade was produced in the same manner as in Example 1 except that an isocyanate compound prepared by dissolving a prepolymer having a content of NCO of 15.0% in butyl acetate so as to have a viscosity of 100 mPa·s was used, and the isocyanate compound was treated at 50° C. for 3 hours after application. The contact angle of the coating solution to the non-treated blade member was 28°. Impregnation of the polyurethane elastomer layer with the prepolymer was hardly found, but a layer of the prepolymer itself deposited and cured on the surface of the polyurethane elastomer layer at a thickness of 8 μm was formed.

The concentrations of nitrogen in the blade member were as follows:

$N_0$: 5.0 wt %, $N_5$: 5.0 wt %, $N_e$: 1.3 wt %; and $\Delta1=N_0-N_5=0.0$ wt %, $\Delta2=N_5-N_e=3.7$ wt %.

As the hardness of the blade member, the hardness in the portion treated with the isocyanate compound $H_a$ was 74.9 IRHD, and that in the portion not treated with the isocyanate compound $H_b$ was 72.0 IRHD. The portion treated with the isocyanate compound had a roughness $Rz_{jis}$ of 1.3 μm and a friction coefficient of 0.8. As a result of evaluation using the printer above, the cleaning blade had no turn-over and was rated as "A." The faulty cleaning were not evaluated because the coating portion was peeled off during the durability test, and the evaluation was discontinued. This is for the following reason: because the contact region of the blade member to contact the image bearing member includes two different materials having different properties, the contact region has no structure in which the concentration of nitrogen is continuously changed; for this, the two materials have different behaviors at the time of contacting the image bearing member, and the coating portion was peeled off by repeated rubbing.

The results of Examples and Comparative Examples above are shown in Table 1.

TABLE 1

| | | | Example 1 | Example 2 | Example 3 | Example 4 | Example 5 | Example 6 |
|---|---|---|---|---|---|---|---|---|
| Condition on contacting treatment | Isocyanate compound | | Modified MDI | Modified MDI | Modified MDI | MDI | MDI | Polymeric MDI |
| | Solvent for dilution | | None | MIBK | MIBK | MEK | MEK | MEK |
| | Viscosity of solution | mPa · s | 76 | 4 | 1.7 | 1.2 | 3.8 | 98 |
| | Contact angle | ° | 44 | 27 | 23 | 6.2 | 19 | 48 |
| | Contacting method | | Application | Application | Application | Application | Application | Application |
| | NCO concentration per unit area | $mmol/mm^2$ | $41.7 \times 10^{-5}$ | $5.6 \times 10^{-5}$ | $1.9 \times 10^{-5}$ | $2.1 \times 10^{-5}$ | $22.1 \times 10^{-5}$ | $59.2 \times 10^{-5}$ |
| | Removal of surface residue | | No | No | No | No | No | No |
| Concentration of nitrogen | Surface $N_0$ | Wt % | 10.5 | 7.2 | 4.5 | 5.5 | 12.8 | 18.6 |
| | Depth 5 μm $N_5$ | Wt % | 4.1 | 3.3 | 2.0 | 3.1 | 5.8 | 5.5 |
| | Depth no longer having change $N_e$ | Wt % | 1.3 | 1.3 | 1.3 | 1.3 | 1.3 | 1.3 |
| | Difference of concentration $\Delta 1 = N_0 - N_5$ | Wt % | 6.4 | 3.9 | 2.5 | 2.4 | 7.0 | 13.1 |
| | Difference of concentration $\Delta 2 = N_5 - N_e$ | Wt % | 2.8 | 2.0 | 0.7 | 1.8 | 4.5 | 4.2 |
| Roughness in treated portion ($Rz_{jis}$) | | μm | 0.6 | 0.8 | 0.8 | 0.8 | 1.1 | 1.2 |
| Friction coefficient of treated portion | | | 0.5 | 0.5 | 0.6 | 0.6 | 0.5 | 0.5 |
| Hardness of blade member (IRHD) | | Treated portion Ha | 73.4 | 72.5 | 72.0 | 72.5 | 75.5 | 74.1 |
| | | Non-treated portion $H_b$ | 72.3 | 72.0 | 72.0 | 72.2 | 72.2 | 71.9 |
| | | Ha − Hb | 1.1 | 0.5 | 0.0 | 0.3 | 3.3 | 2.2 |
| Evaluation using printer | Turn-over of blade member | | A | A | A | A | A | A |
| | Cleaning properties | | A | A | A | A | B | B |

| | | | Comparative Example 1 | Comparative Example 2 | Comparative Example 3 | Comparative Example 4 | Comparative Example 5 |
|---|---|---|---|---|---|---|---|
| Condition on contacting treatment | Isocyanate compound | | Modified MDI | Polymeric MDI | Modified MDI | Modified MDI | Pre-polymer |
| | Solvent for dilution | | MIBK | None | None | None | Butyl acetate |
| | Viscosity of solution | mPa · s | 1.2 | 155 | 76 | 76 | 100 |
| | Contact angle | ° | 11.2 | 52 | 44 | 44 | 28 |
| | Contacting method | | Application | Application | Application | Application | Application |
| | NCO concentration per unit area | $mmol/mm^2$ | $0.9 \times 10^{-5}$ | $65.1 \times 10^{-5}$ | $57.2 \times 10^{-5}$ | $41.7 \times 10^{-5}$ | $10.8 \times 10^{-5}$ |
| | Removal of surface residue | | No | No | No | Yes | No |
| Concentration of nitrogen | Surface $N_0$ | Wt % | 1.4 | 19.1 | 22.0 | 5.0 | 5.0 |
| | Depth 5 μm $N_5$ | Wt % | 1.3 | 13.1 | 18.2 | 4.5 | 5.0 |
| | Depth no longer having change $N_e$ | Wt % | 1.3 | 1.3 | 1.3 | 1.3 | 1.3 |
| | Difference of concentration $\Delta 1 = N_0 - N_5$ | Wt % | 0.1 | 6.0 | 3.8 | 0.5 | 0.0 |
| | Difference of concentration $\Delta 2 = N_5 - N_e$ | Wt % | 0.0 | 11.8 | 16.9 | 3.2 | 3.7 |
| Roughness in treated portion ($Rz_{jis}$) | | μm | 0.8 | 5.2 | 2.6 | 0.8 | 0.8 |
| Friction coefficient of treated portion | | | 2.1 | 0.8 | 0.9 | 0.8 | 0.8 |
| Hardness of blade member (IRHD) | | Treated portion Ha | 72.3 | 74.1 | 75.5 | 75.2 | 74.9 |
| | | Non-treated portion $H_b$ | 72.3 | 72.2 | 72.2 | 72.1 | 72.0 |
| | | Ha − Hb | 0.0 | 1.9 | 3.3 | 3.1 | 2.9 |
| Evaluation using printer | Turn-over of blade member | | C | A | A | A | A |
| | Cleaning properties | | *1 | C | C | C | *2 |

*1 During the durability test, the blade member was turned over, and not evaluated.

*2 During the durability test, the coating portion was peeled off, and evaluation was not made.

The cleaning blade for an electrophotographic apparatus according to the present invention is useful as a cleaning blade for electrophotographic apparatuses using the electrophotographic techniques such as copiers, laser beam printers, LED printers, and electrophotographic plate making systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-287891, filed Dec. 24, 2010, which is hereby incorporated by reference herein in its entirety.

What is claimed is:

1. A cleaning blade for an electrophotographic apparatus for contacting an image bearing member in an electrophotographic apparatus and removing a remaining toner, the cleaning blade comprising a supporting member and a thermosetting polyurethane elastomer blade member joined to the supporting member, wherein in the blade member, a concentration of nitrogen is gradually increased from an inside of a contact region to contact the image bearing member toward the surface of the contact region; and a relationship between an amount of the concentration of nitrogen to be changed $\Delta 1=N_0-N_5$ and an amount of the concentration of nitrogen to be changed $\Delta 2=N_5-N_e$ is 41>42 wherein a concentration of nitrogen $N_0$ on the surface of the contact region is not less than 5.5 wt % and not more than 20.0 wt %, a concentration of nitrogen $N_e$ is not less than 0.7 wt % and not more than 10 wt % at a depth in which the concentration of nitrogen is no longer changed in the inside of the contact region in the thickness direction vertical to the surface of the contact region, and $N_5$ is a concentration of nitrogen at a depth of 5 μm toward the inside of the contact region in the vertical thickness direction.

2. The cleaning blade for an electrophotographic apparatus according to claim 1, wherein $0 \leq H_a - H_b \leq 2.0$ (IRHD) wherein $H_a$ is a hardness of the contact region of the blade member to contact the image bearing member, and $H_b$ is a hardness of a portion in which the concentration of nitrogen is not gradually increased from the inside toward the surface of the contact region.

3. A method for producing a cleaning blade for an electrophotographic apparatus according to claim 1, the method comprising:

contacting an isocyanate compound with the surface of the contact region of the thermosetting polyurethane elastomer blade member to contact the image bearing member in an amount of the isocyanate compound such that a concentration of an isocyanate group is not less than $1.0\times10^{-5}$ mmol/mm$^2$ and not more than $50.0\times10^{-5}$ mmol/mm$^2$, thereby to impregnate the inside of the blade member with the isocyanate compound.

4. A method for producing a cleaning blade for an electrophotographic apparatus according to claim 2, the method comprising:

contacting an isocyanate compound with the surface of the contact region of the thermosetting polyurethane elastomer blade member to contact the image bearing member in an amount of the isocyanate compound such that a concentration of an isocyanate group is not less than $1.0\times10^{-5}$ mmol/mm$^2$ and not more than $50.0\times10^{-5}$ mmol/mm$^2$, thereby to impregnate the inside of the blade member with the isocyanate compound.

5. The method for producing a cleaning blade for an electrophotographic apparatus according to claim 3, wherein after the isocyanate compound is contacted with the blade member to impregnate the blade member therewith, the isocyanate compound that remains on the surface of the blade member is not removed and is left as it is.

6. The method for producing a cleaning blade for an electrophotographic apparatus according to claim 4, wherein after the isocyanate compound is contacted with the blade member to impregnate the blade member therewith, the isocyanate compound that remains on the surface of the blade member is not removed and is left as it is.

* * * * *